Patented Jan. 4, 1944

2,338,268

UNITED STATES PATENT OFFICE 2,338,268

COMPOSITION OF MATTER AND PROCESS OF PRODUCING CHLORINE DIOXIDE

Ernest Stossel and Ernst Zerner, New York, N. Y.

No Drawing. Application May 2, 1941,
Serial No. 391,544

20 Claims. (Cl. 252—187)

Our invention relates to an improved process of producing chlorine dioxide and to compositions of matter used in combination with this process.

It is well known that chlorine dioxide is an excellent bleaching agent and that it has certain advantages over chlorine or hypochlorites when used for bleaching purposes. However, it is very difficult to handle, as, in liquefied state, it has a tendency to explode, and aqueous solutions saturated with chlorine dioxide contain only a very small percentage of the same; furthermore, such aqueous solutions are not stable.

It is, therefore, an object of our present invention to provide a new composition of matter, by the aid of which chlorine dioxide can be produced in an easy, simple, and riskless way.

It is a further object of our invention to provide a new composition of matter which, when heated, forms a mixture of chlorine dioxide and carbon dioxide, eliminating thereby any danger of explosion.

It is still a further object of our invention to provide a new composition of matter which is stable at room temperature, and when heated above this temperature forms chlorine dioxide.

It is another object of our invention to provide a process of producing chlorine dioxide, diluted in an indifferent gas, without any danger of explosion.

Still another object of our invention is to provide as initial material for producing chlorine dioxide a new composition of matter, by the aid of which chlorine dioxide can be produced by the consumer himself.

With the above objects in view, our present invention consists mainly in a new composition of matter comprising a dry mixture of a salt of chloric acid, and an acid adapted to form chlorine dioxide when mixed with said salt of chloric acid and heated above room temperature. Our invention further consists in a process of producing chlorine dioxide, which comprises the steps of mixing the ingredients of the above composition of matter in dry state, forming thereby a dry mixture of these ingredients, and heating thereafter this mixture, preferably in presence of a small amount of water or steam, above room temperature, forming thereby chlorine dioxide intimately mixed with, and thus diluted in carbon dioxide.

The expression "dry," as used throughout this specification and claims, means that the surface of the particles of the substances used for our new composition of matter is dry, i. e., that at room temperature no reaction is possible between the particles of the various ingredients of the composition. This is important, as otherwise chlorine dioxide would be formed already at room temperature, thus making the composition of matter, used as initial material, unstable at this temperature and not storable under normal conditions.

This "dry" condition of the surface of the particles of the ingredients used for our new composition of matter can be attained in the most different ways: for instance, the ingredients may be dehydrated, thus forming a substantially anhydrous composition; furthermore, it is possible to provide at least the particles of one of the ingredients—preferably those of the acid if the same is used in moisture-containing state—with a coating which is moisture-impermeable at room temperature only, but melts at higher temperatures, e. g., a paraffin coating; thus, undesired reaction between moisture-containing acid particles and the chloric acid salt forming another ingredient of the composition can be prevented.

We have found that best results can be obtained by using as chloric acid salt a chlorate of a metal selected from the group consisting of the alkali metals and the alkaline earth metals; among these chlorates, we prefer to use the chlorates of sodium, potassium, magnesium, barium, calcium or the like.

As chlorine dioxide forming acid, we prefer to use organic polybasic acids, for instance, oxalic acid, citric acid, maleic acid, fumaric acid, aconitic acid, tartaric acid, and other similar acids. As already stated above, these acids should be in anhydrous state, or their particles should be provided with a moisture-impermeable coating, e. g., they should be coated with paraffin.

From the new composition of matter, which should contain at least one substance of each of the above defined substance-groups, chlorine dioxide is formed by heating it to above 50° C., preferably to about 60–80° C.; this heating is carried out preferably in presence of a very small quantity of water or steam. During heating, reaction between the chlorate and the organic acid takes place, whereby out of the chlorate chloric acid is set free and transformed to chlorine dioxide under simultaneous formation of carbon dioxide. Thus, a mixture of chlorine dioxide and carbon dioxide is formed; this chlorine dioxide-carbon dioxide mixture, i. e., the chlorine dioxide diluted in a neutral gas, does not explode, and thus any danger or risk for the user is avoided.

In order to reduce the needed amount of the relatively expensive organic polybasic acid, we propose to use, if desired, for freeing of the chloric acid out of the chlorate an anhydrous solid inorganic acid or an inorganic acid salt as, for instance, anhydrous sodium acid sulphate. Even usually liquid acids, as anhydrous phosphoric acid or anhydrous formic acid, may be used if they are brought into solid form by adsorption by a suitable adsorbent, like silica gel.

Our invention will be further understood from the following specific examples:

I. Sixty parts by weight of anhydrous oxalic acid and forty parts by weight of sodium chlorate are intimately mixed; at room temperature, this mixture is stable for a practically unlimited time. When chlorine dioxide is needed, the thus prepared mixture is heated in presence of small amounts of water or steam above room temperature, yielding thereby about 17 per cent by weight of chlorine dioxide intimately mixed and thus diluted in carbon dioxide.

II. Seventy parts by weight of tartaric acid, the particles of which are coated with paraffin, are mixed with thirty parts by weight of calcium chlorate. The thus prepared mixture is heated in presence of a small amount of steam to above 50° C., yielding thereby chlorine dioxide mixed with carbon dioxide.

III. Fifty parts by weight of anhydrous citric acid are mixed with fifty parts by weight of magnesium chlorate. The thus prepared mixture is heated in presence of a small amount of water to 80° C., yielding thereby chlorine dioxide diluted in carbon dioxide.

IV. Sixty-five parts by weight of anhydrous maleic acid and thirty-five parts by weight of barium chlorate are mixed. The thus prepared mixture is heated to about 80° C. yielding chlorine dioxide diluted in carbon dioxide.

V. Fifteen parts by weight of anhydrous oxalic acid, thirty-five parts by weight of magnesium chlorate, and fifty parts by weight of anhydrous sodium acid sulphate are intimately mixed. The thus prepared mixture is heated in presence of small amounts of water and steam to 60–80° C., forming thereby chlorine dioxide diluted in carbon dioxide.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What we claim as new and desire to secure by Letters Patent is:

1. Composition of matter consisting of a dry mixture of an anhydrous salt of chloric acid, and an anhydrous solid organic acid forming chlorine dioxide diluted with carbon dioxide when mixed with said salt of chloric acid and heated above room temperature in the presence of a small amount of water.

2. Composition of matter consisting of a dry mixture of an anhydrous salt of chloric acid and an anhydrous acid selected from the group consisting of oxalic acid, citric acid, tartaric acid, maleic acid, fumaric acid, and aconitic acid.

3. Stable composition of matter consisting of a dry mixture of an anhydrous chlorate of a metal selected from the group consisting of the alkali metals and the alkaline earth metals, and an anhydrous solid organic acid forming chlorine dioxide diluted with carbon dioxide when mixed with said chlorate and heated above room temperature in the presence of a small amount of water.

4. Stable composition of matter consisting of a dry mixture of an anhydrous chlorate of a metal selected from the group consisting of the alkali metals and the alkaline earth metals, and an anhydrous organic polybasic acid.

5. Stable composition of matter consisting of a dry mixture of an anhydrous chlorate of a metal selected from the group consisting of the alkali metals and the alkaline earth metals and an anhydrous acid selected from the group consisting of oxalic acid, citric acid, tartaric acid, maleic acid, fumaric acid, and aconitic acid.

6. Composition of matter consisting of a dry mixture of an anhydrous chlorate of a metal selected from the group consisting of sodium, potassium, magnesium, barium, and calcium, and an anhydrous acid selected from the group consisting of oxalic acid, citric acid, tartaric acid, maleic acid, fumaric acid, and aconitic acid.

7. Composition of matter consisting of a dry mixture of an anhydrous salt of chloric acid, an anhydrous solid organic acid forming chlorine dioxide diluted with carbon dioxide when mixed with said salt of chloric acid and heated above room temperature, and an anhydrous solid substance selected from the group consisting of anhydrous solid inorganic acids and anhydrous solid inorganic acid salts freeing chloric acid when mixed with said salt of chloric acid and heated above room temperature in the presence of a small amount of water.

8. Composition of matter consisting of a dry mixture of an anhydrous salt of a chloric acid, an anhydrous organic polybasic acid, and an anhydrous solid substance selected from the group consisting of anhydrous solid inorganic acids and anhydrous solid inorganic acid salts freeing chloric acid when mixed with said salt of chloric acid and heated above room temperature in the presence of a small amount of water.

9. Stable composition of matter consisting of a dry mixture of an anhydrous chlorate of a metal selected from the group consisting of the alkali metals and the alkaline earth metals, an anhydrous solid organic acid forming chlorine dioxide diluted with carbon dioxide when mixed with said chlorate and heated above room temperature, and an anhydrous solid substance selected from the group consisting of anhydrous solid inorganic acids and anhydrous solid inorganic acid salts freeing chloric acid when mixed with said metal chlorate and heated above room temperature in the presence of a small amount of water.

10. Composition of matter consisting of a dry mixture of an anhydrous chlorate of a metal selected from the group consisting of sodium, potassium, magnesium, barium, and calcium, an anhydrous acid selected from the group consisting of oxalic acids, citric acid, tartaric acid, maleic acid, fumaric acid, and aconitic acid, and an anhydrous solid substance selected from the group consisting of anhydrous solid inorganic acids and anhydrous solid inorganic acid salts freeing chloric acid when mixed with said metal chlorate and heated above room temperature in the presence of a small amount of water.

11. Composition of matter consisting of a dry mixture of an anhydrous chlorate of a metal selected from the group consisting of sodium, potassium, magnesium, barium, and calcium, of an anhydrous acid selected from the group consisting of oxalic acid, citric acid, tartaric acid, maleic acid, fumaric acid, and aconitic acid, and of anhydrous sodium acid sulphate.

12. Process of producing chlorine dioxide, comprising mixing an anhydrous salt of a chloric acid with an anhydrous organic polybasic acid, and heating said mixture above room temperature, forming thereby chlorine dioxide mixed with, and thus diluted with carbon dioxide.

13. Process of producing chlorine dioxide, comprising the steps of mixing an anhydrous chlorate of a metal selected from the group consisting of the alkali metals and the alkaline earth metals with an anhydrous acid selected from the group consisting of oxalic acid, citric acid, tartaric acid, maleic acid, fumaric acid and aconitic acid, and heating said mixture above 50° C., forming thereby chlorine dioxide intimately mixed with, and thus diluted with carbon dioxide.

14. Process of producing chlorine dioxide, comprising intimately mixing an anhydrous chlorate of a metal selected from the group consisting of sodium, potassium, magnesium, barium and calcium, with an anhydrous organic polybasic acid, and heating said mixture in presence of a small amount of water to about 60–80° C., forming thereby chlorine dioxide intimately mixed with, and thus diluted with carbon dioxide.

15. A process of producing chlorine dioxide comprising mixing an anhydrous salt of a chloric acid with an anhydrous organic polybasic acid, and a substance selected from the group consisting of inorganic acids and inorganic acid salts in anhydrous solid form, freeing chloric acid when mixed with said salt of chloric acid and heated above room temperature, and heating said mixture above room temperature, forming thereby chlorine dioxide intimately mixed with, and thus diluted with carbon dioxide.

16. Process of producing chlorine dioxide, comprising intimately mixing an anhydrous chlorate of a metal selected from the group consisting of sodium, potassium, magnesium, barium, and calcium, with anhydrous sodium acid sulphate and an anhydrous acid selected from the group consisting of oxalic acid, citric acid, tartaric acid, maleic acid, fumaric acid, and aconitic acid, and heating said mixture in presence of a small amount of water to about 60–80° C., forming thereby chlorine dioxide intimately mixed with, and thus diluted with carbon dioxide.

17. Process of producing chlorine dioxide, comprising intimately mixing an anhydrous chlorate of a metal selected from the group consisting of sodium, potassium, magnesium, barium, and calcium, with an anhydrous organic polybasic acid, and heating said mixture while adding a small amount of steam to about 60° to 80° C., thereby forming chlorine dioxide diluted with carbon dioxide.

18. Process of producing chlorine dioxide, comprising intimately mixing an anhydrous chlorate of a metal selected from the group consisting of sodium, potassium, magnesium, barium, and calcium, with anhydrous sodium acid sulphate and an anhydrous acid selected from the group consisting of oxalic acid, citric acid, tartaric acid, maleic acid, fumaric acid, and aconitic acid, and heating said mixture while adding a small amount of steam to about 60° to 80° C., forming thereby chlorine dioxide diluted with carbon dioxide.

19. Composition of matter consisting of a dry mixture of an anhydrous salt of chloric acid, a solid organic acid forming chlorine dioxide diluted with carbon dioxide when mixed with said salt of chloric acid and heated above room temperature, and anhydrous phosphoric acid.

20. Composition of matter consisting of a dry mixture of an anhydrous salt of chloric acid, a solid organic acid forming chlorine dioxide diluted with carbon dioxide when mixed with said salt of chloric acid and heated above room temperature, and anhydrous formic acid.

ERNEST STOSSEL.
ERNST ZERNER.